June 28, 1955

W. L. GASKELL 2,711,762

ARBOR SAW

Filed Dec. 8, 1951

INVENTOR.
Walter L. Gaskell.
BY
Harness, Dickey & Pierce
ATTORNEYS.

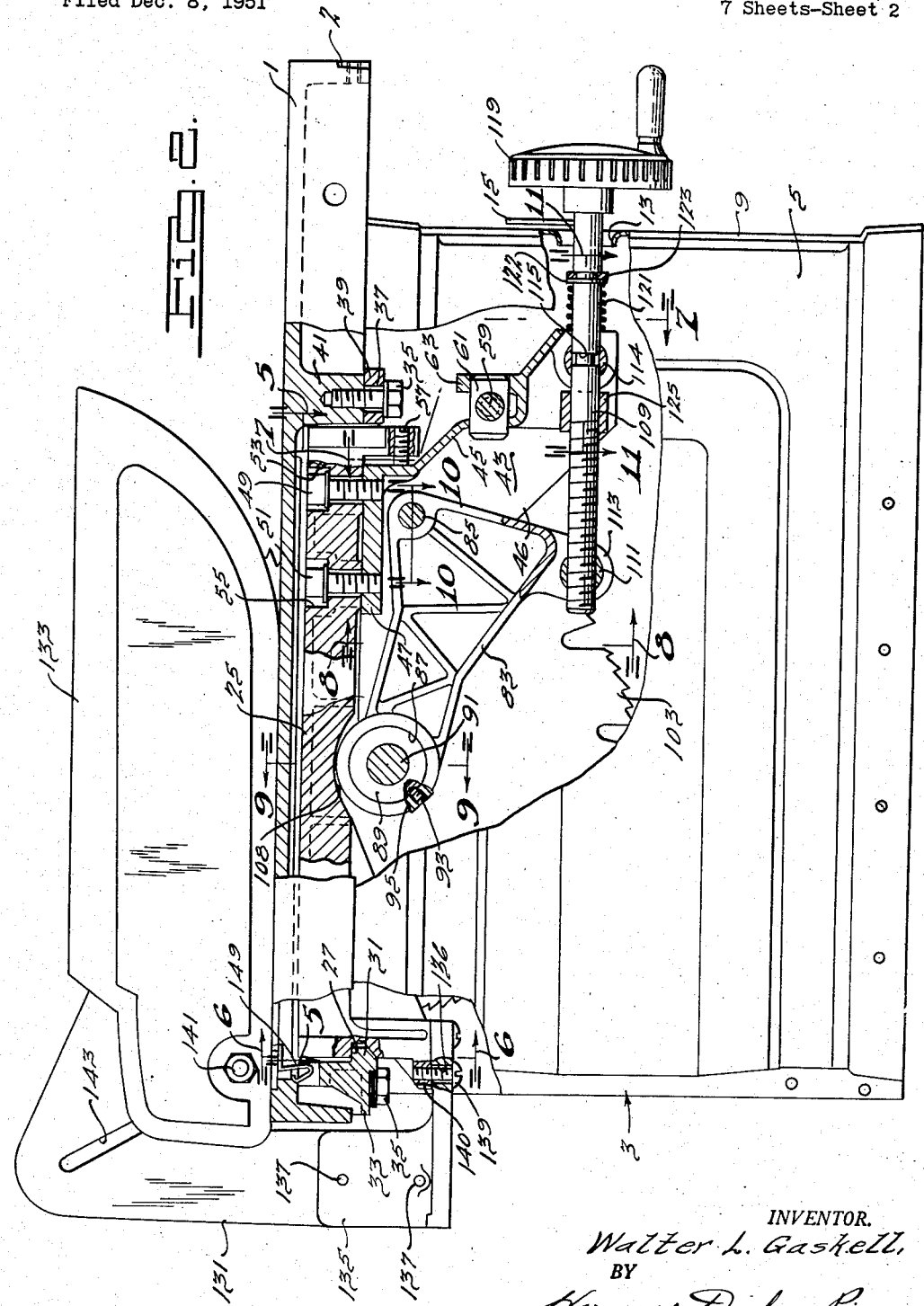

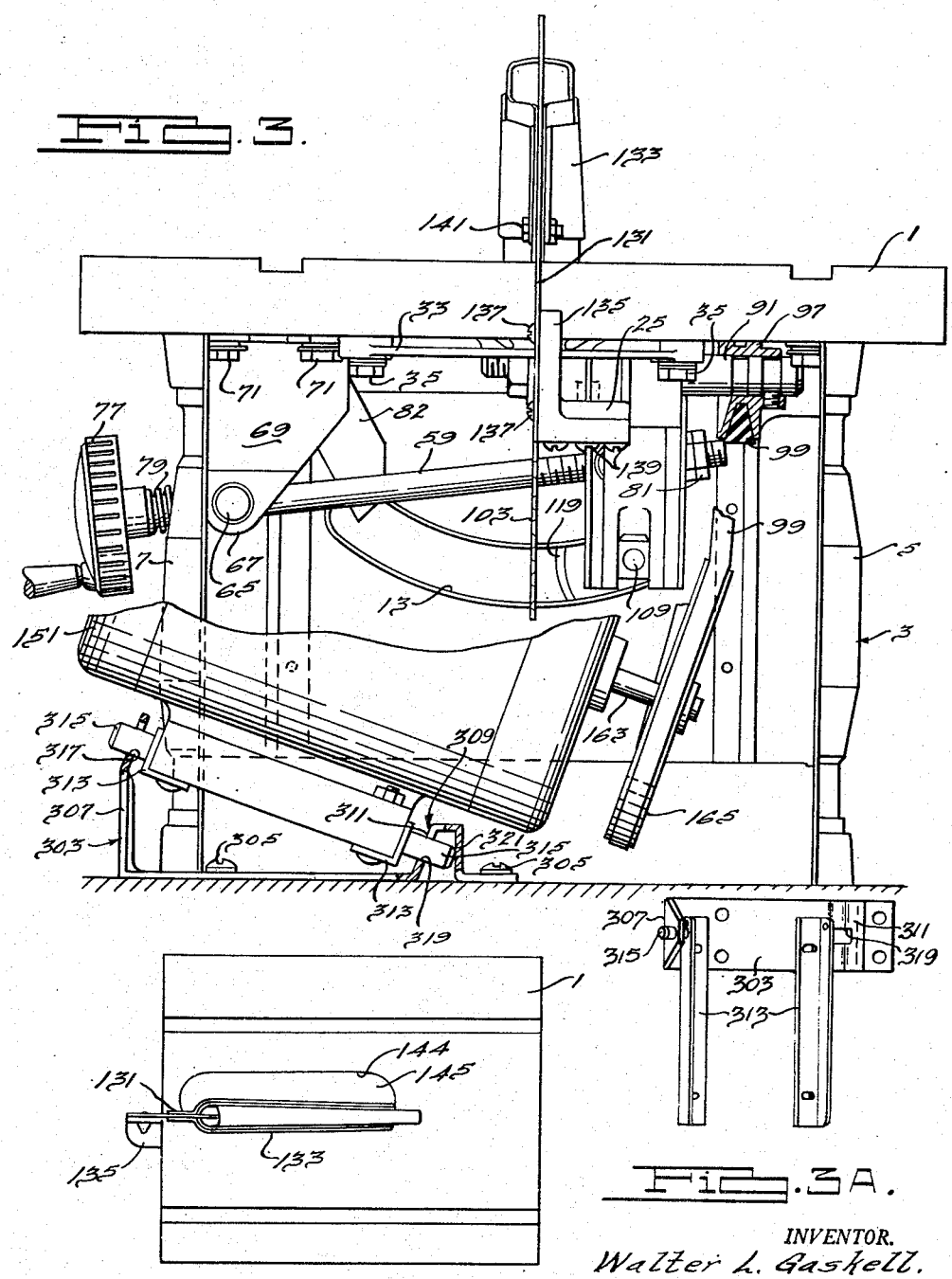

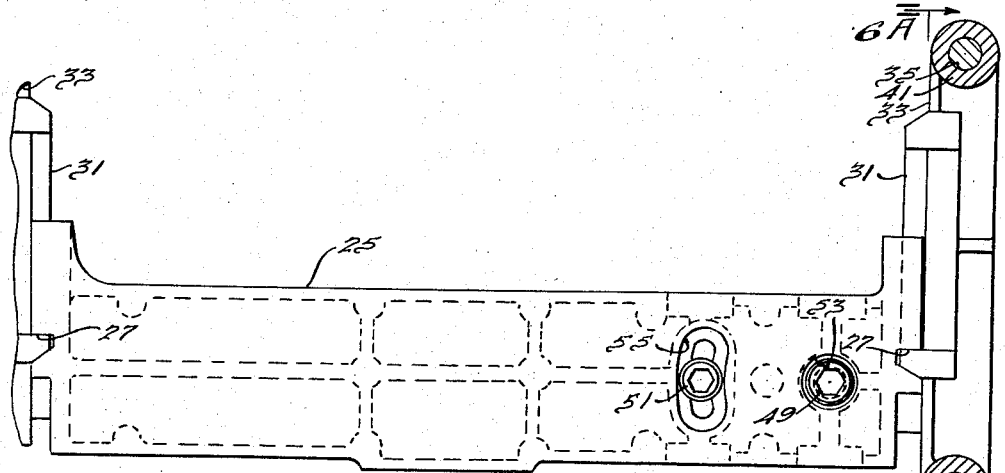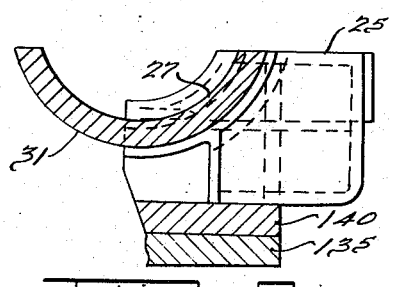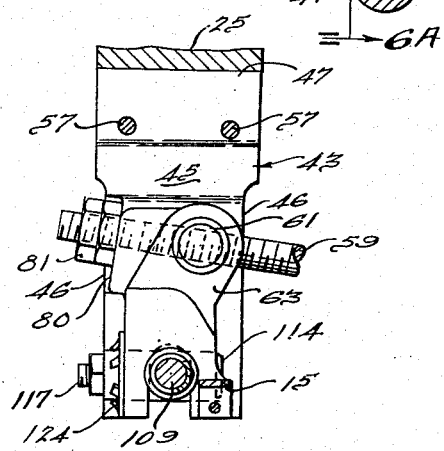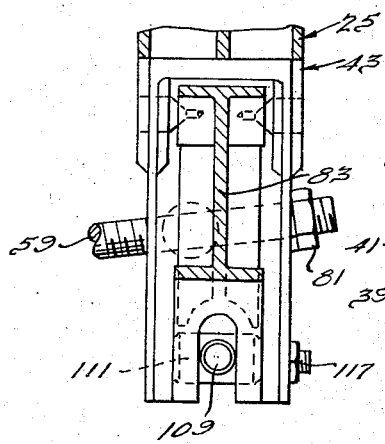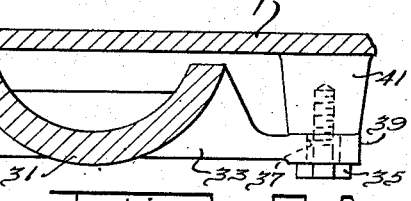

June 28, 1955  W. L. GASKELL  2,711,762
ARBOR SAW
Filed Dec. 8, 1951  7 Sheets-Sheet 5
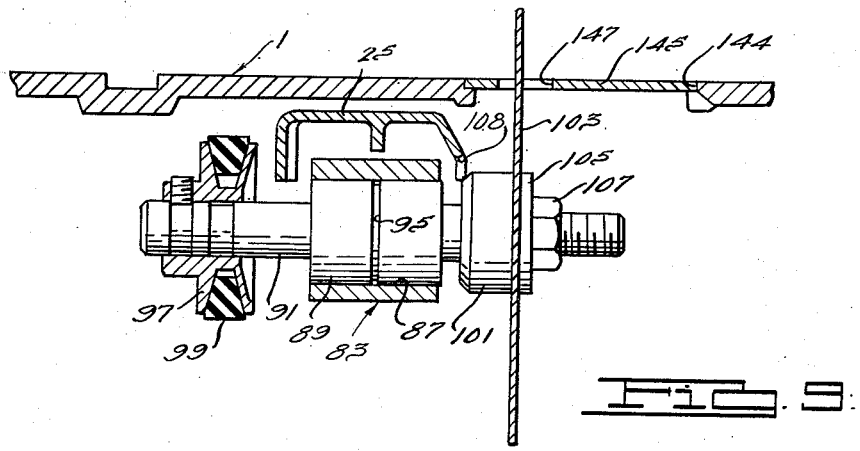
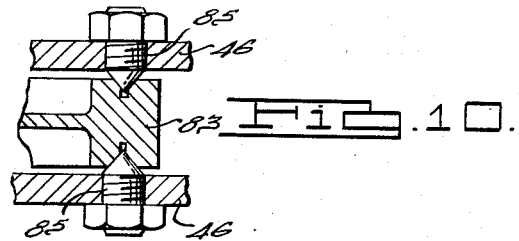
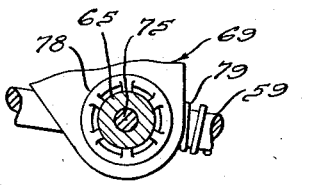
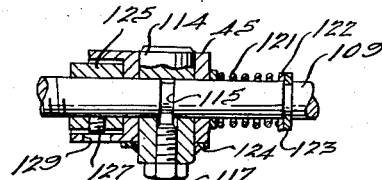
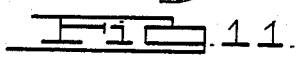
INVENTOR.
Walter L. Gaskell.
BY
Harness, Dickey & Pierce
ATTORNEYS.

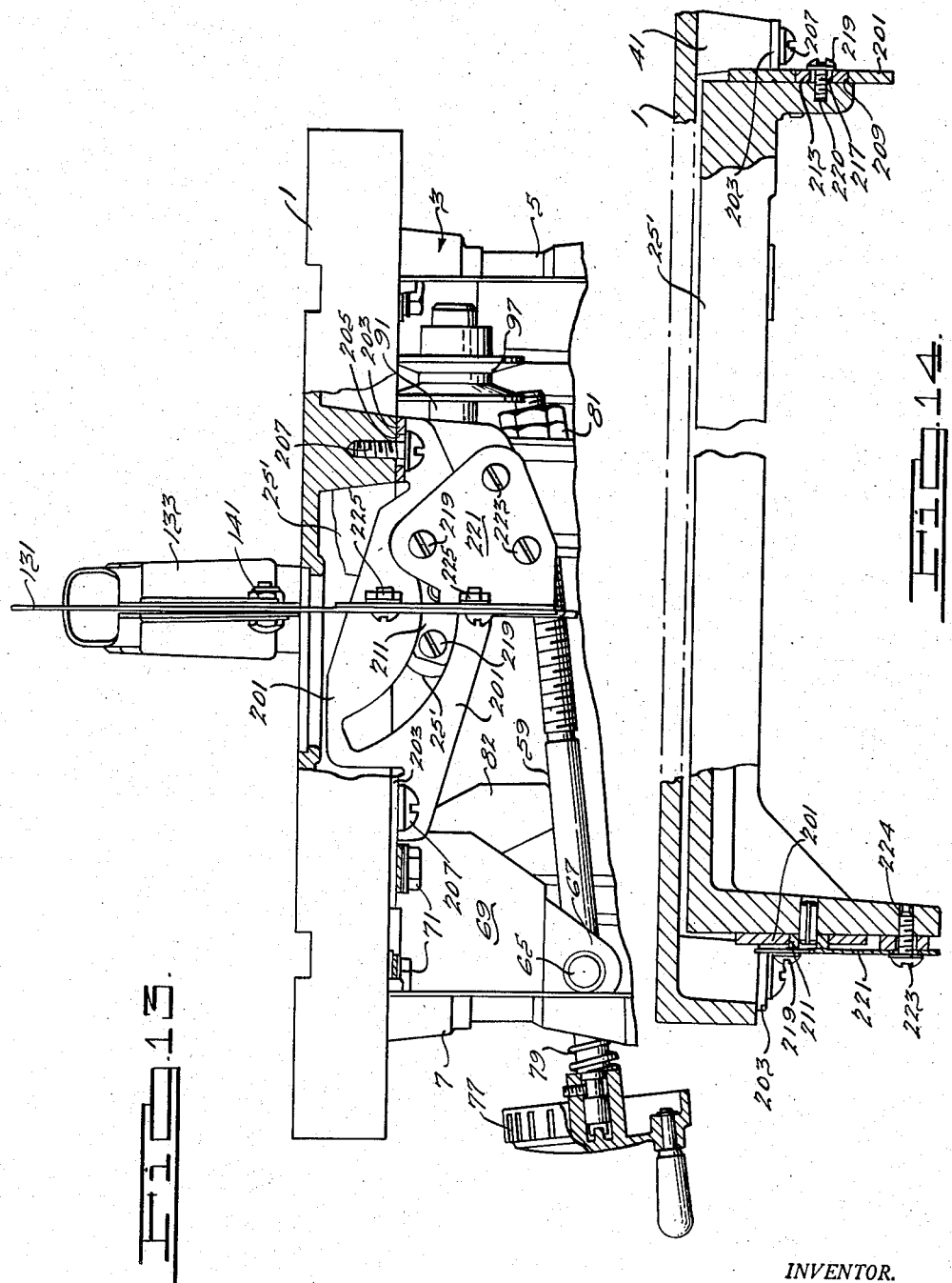

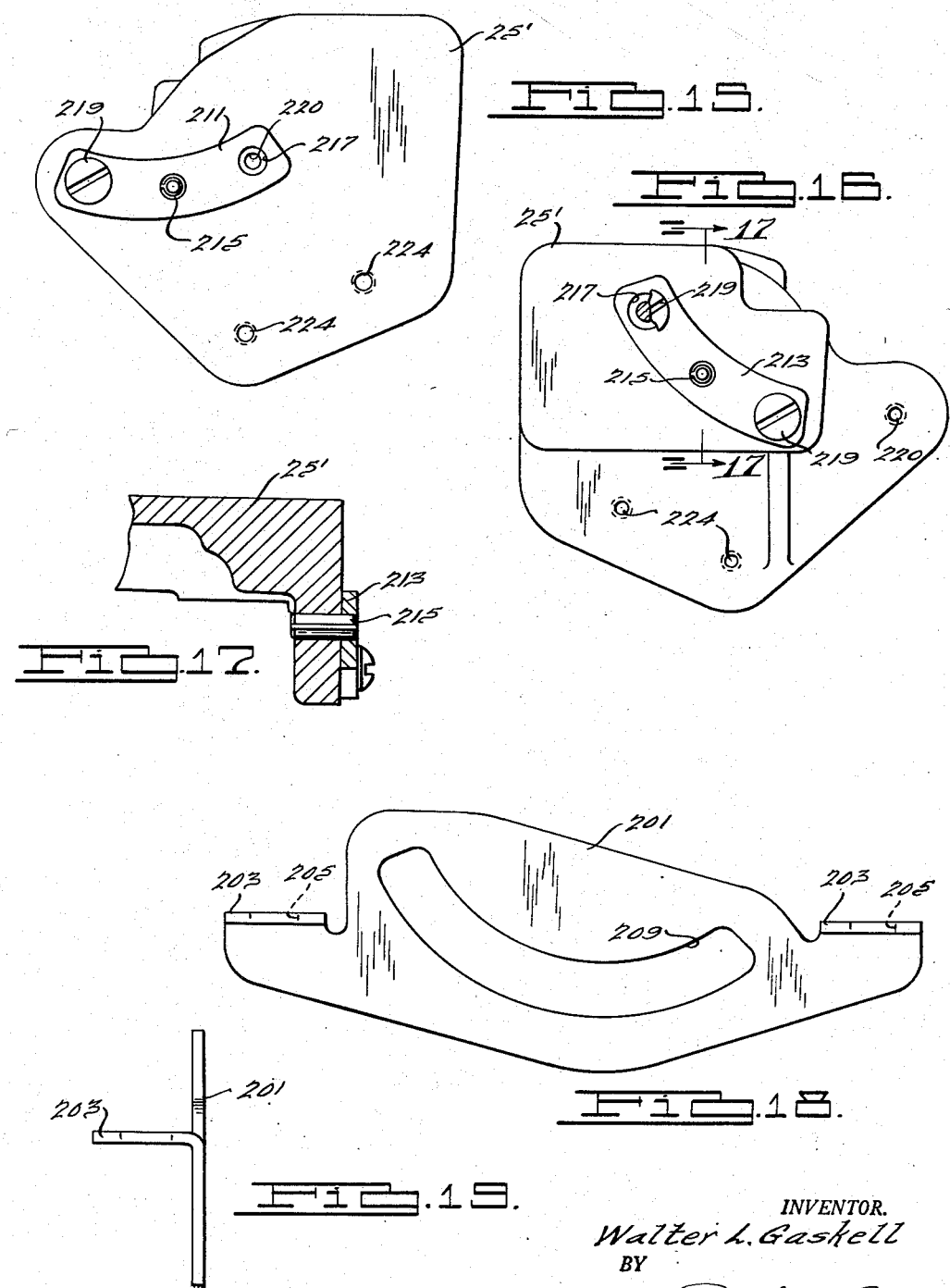

United States Patent Office 2,711,762
Patented June 28, 1955

2,711,762
ARBOR SAW

Walter L. Gaskell, Ypsilanti, Mich., assignor to King-Seeley Corporation, Ann Arbor, Mich., a corporation of Michigan Application December 8, 1951, Serial No. 260,698

9 Claims. (Cl. 143—36)

This invention relates to machine tools and, in particular, to tools of the type having a rotary arbor which may be tilted and elevated, e. g., bench saws.

In recent years, the manufacture of machine tools for the hobbyist or home workshop has become widespread. This is a cost-conscious market which demands durable, properly functioning tools at a low price. Its requirements are therefore more exacting than the older industrial market in which strength, performance, and durability were primary factors and cost secondary so that for this market it was possible to substantially custom build each machine tool.

As a general rule, it seems to be necessary to impair the performance or durability of a machine tool in order to decrease its cost and increase its ease of manufacture, and engineers designing for the home workshop market, in particular, are constantly searching for designs which will resolve this dilemma. They find that very often rather insignificant structural changes or concepts are of great importance commercially because they permit the machine tool to be manufactured at a lower cost without a corresponding sacrifice in its performance or durability.

It is thus an object of this invention to provide a bench saw construction which is adapted especially to meet the requirements of the home workshop market, though, obviously the features of construction may be used with benefit in saws intended for the industrial market.

The present bench saw construction includes structural features whereby a number of adjustments may be made at final assembly of the individual parts of the saw. It is therefore possible to manufacture the various parts with rather wide dimensional variations without affecting the ultimate alignment and performance of the tool. The present invention features a three-piece support means for the arbor saw which is suspended from the table top and which enables the saw to be elevated or tilted with respect to the table top. The support means is more readily manufactured and more easily assembled into accurate alignment than structures known commercially heretofore but, nevertheless, is durable and rigid to the extent that dado blades, for example, may be substituted for the arbor saw without harm to the equipment.

Other features of the invention, including a novel casing and motor mount, will be described hereinafter in connection with the accompanying drawings, wherein:

Fig. 2 is a side elevation taken from the left of Fig. 1 and having parts broken away and parts shown in section;

Fig. 3 is a rear elevation of a structure shown in the preceding figure;

Fig. 3A is a plan view of the motor mounting, the motor being removed;

Fig. 4 is a plan view on a reduced scale of the structure shown in the preceding figures with the motor omitted;

Fig. 5 is a section taken along the line 5—5 of Fig. 2;

Fig. 6 is a section taken along the line 6—6 of Fig. 2;

Fig. 6A is a section taken along the line 6A—6A of Fig. 5;

Fig. 7 is a section taken along the line 7—7 of Fig. 2;

Fig. 8 is a section taken along the line 8—8 of Fig. 2;

Fig. 9 is a section taken along the line 9—9 of Fig. 2;

Fig. 10 is a section taken along the line 10—10 of Fig. 2;

Fig. 11 is a section taken along the line 11—11 of Fig. 2;

Fig. 12 is a section taken along the line 12—12 of Fig. 1;

Fig. 12A is a section taken along the line 12A—12A of Fig. 12;

Fig. 13 is a rear elevation of a portion of a bench saw with parts broken away and parts in section showing a different form of mounting for the tiltable saw support;

Fig. 14 is a side elevation of the frame piece or arbor support with trunnion brackets and section of the table shown fragmentarily, the parts suspended on the frame piece being removed;

Fig. 15 is an end elevation of the rear face of the frame piece as it appears prior to assembly in the trunnion brackets;

Fig. 16 is a view similar to Fig. 15 but taken of the front face on the frame piece;

Fig. 17 is a section taken along the line 17—17 of Fig. 16;

Fig. 18 is a detail side elevation of a trunnion bracket used in the modification of Fig. 13; and Fig. 19 is an end elevation of the bracket shown in Fig. 18.

Figures 1, 1A:
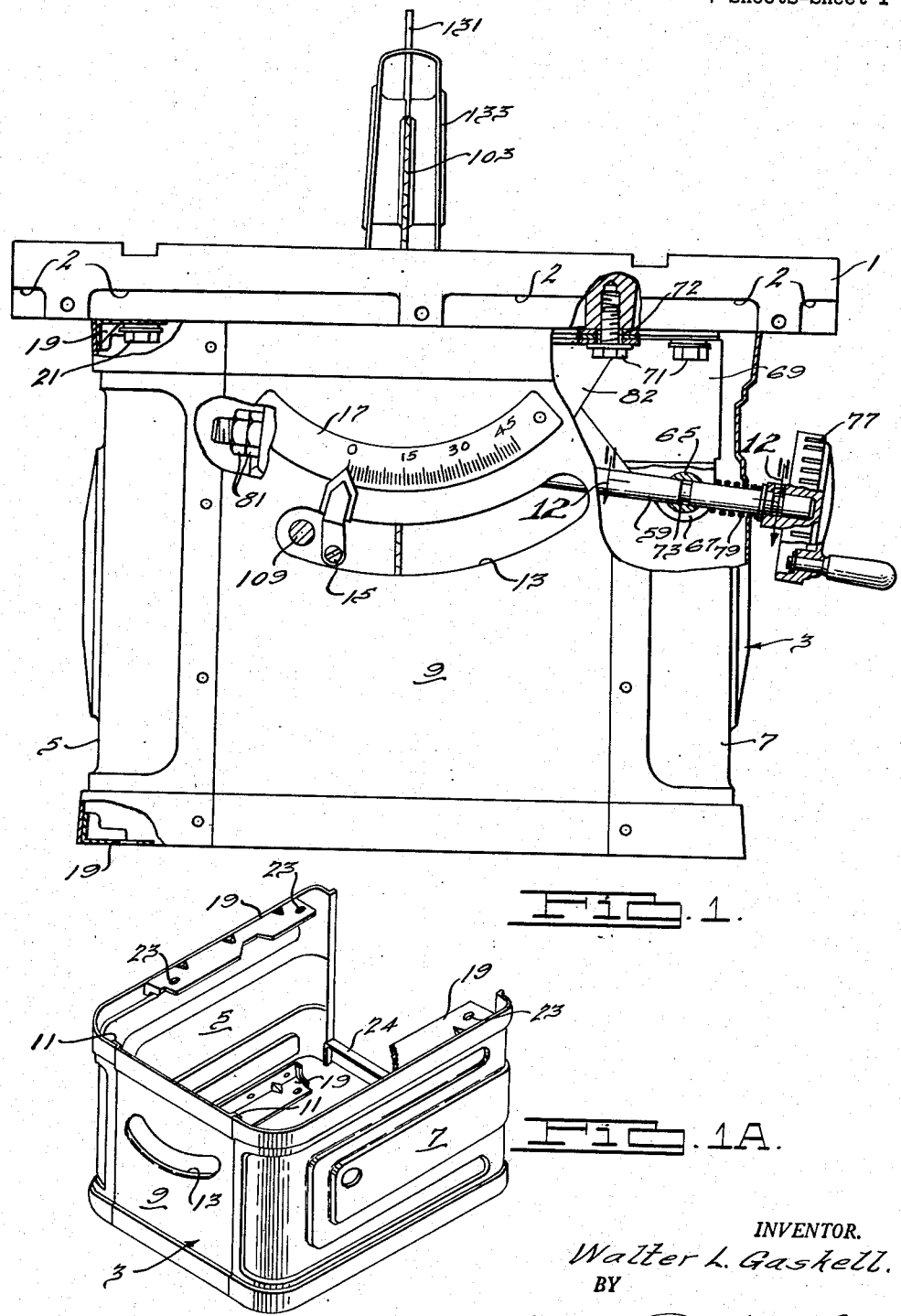
Figure 1 is a front elevation with parts broken away and parts in section of one form of the invention.
Fig. 1A is a perspective view of the base or casing shown in Fig. 1.

Referring first to the embodiment of the invention shown in Figs. 1–12, the arbor saw and its operating mechanism are attached to and suspended from the table casting 1 which has reliefs 2 formed in its front face for the escape of sawdust when the saw is used with the fence construction of my copending application, Serial No. 260,697, filed December 8, 1951, entitled "Fence Mounting," issued May 4, 1954, as Patent No. 2,677,400. The table casting, in turn, is supported on a sheet metal frame or box 3, shown best in Fig. 1A with the table removed. The base 3 is formed of three principal stampings, the left- and right-hand sides 5 and 7, and the front panel 9. The side panels are bent into arcuate form at their front edges and fit in jogged or offset edges 11 of the front panel 9 to which they are suitably secured, preferably by spot welding. The front panel 9 has an arcuate opening 13 in it through which a pointer shaft and pointer assembly 15 extends when the table is mounted on the box so that the pointer may cooperate with a scale 17 secured on the face of the panel 9 to indicate the angle of tilt of the arbor saw blade. Four similar angle-shaped stampings 19 are attached to the top and bottom edges of the side panels 5 and 7. The table 1 rests on the top stampings 19 and is secured to them by way of bolts 21 and 71 which pass through openings 23 in the angle stampings and thread into suitable pads formed on the table 1. The rear of the box may be reinforced by a cross piece 24 which is preferably located at the bottom of the side panels 5 and 7 so as to leave a substantial rear opening through which the arbor saw mechanism attached to the table 1 may be passed in order to mount the table assembly on the angle pieces 19. The angles 19 at the bottom of the side panels 5 and 7 obviously serve as footings for the mechanism and may be provided with apertures or the like for permanent attachment to a desired foundation, such as a work bench.

The arbor saw blade is mounted so that its axis of rotation is parallel to the front panel 9 and so that it may be raised and lowered vertically as well as tilted with respect to the horizontal or to the surface of the table 1.

The tilting of the axis of the arbor saw is permitted by the mounting thereof on a frame piece 25 (Fig. 5) which is attached to the table so that it is angularly adjustable about a horizontal axis lying in the surface of the table and extending perpendicularly to the front panel 9. The frame piece 25 is preferably a light metal die casting that is channel shaped to open downwardly (Fig. 9) but which is provided with suitable ribs and pads for strengthening it and receiving attaching screws. The frame piece 25 has wedge-shaped grooves 27 (Figs. 2 and 5) formed in its end faces. Each of these grooves may extend over a quadrant of a circle shown in Fig. 6. The top portion of this quadrant opens out of the top surface of the frame piece 25 while the lower portion opens out of a side of the frame piece which is offset substantially from its main body portion. The grooves 27 receive wedge-shaped trunnions 31 which depend from brackets 33 that are screwed to the underside of the table by means of the bolts 35. The brackets 33 fit up inside of the table 1 as seen in Fig. 6A and the bolts 35 extend through oversized holes 37 in flanges 39 that are part of the brackets 33. The flanges 39 abut the bottom faces of pads 41 depending from the table 1 and into which the bolts 35 thread.

It will be recognized that the fact that the holes 37 are oversized permits the brackets 33 to be shifted longitudinally and transversely thus tending to minimize the need for close dimensional tolerances on the various parts secured by them to the table 1. As will become evident hereinafter, the adjustments at assembly which the oversize holes 37 permit enable the saw blade to be accurately squared and aligned with other parts of the assembly. Where extreme accuracy of alignment is desirable, conventional shims or washers between the flanges 39 and pads 41 will take care of vertical adjustments, if they are necessary.

Each wedge-shaped recess 27 and bearing surface 31 is actually of a semi-wedge conformation. That is, the load receiving top surface of the groove is parallel to the axis about which the projection 31 and the surface 27 are generated (i. e., the axis of tilt of the frame piece 25 and thus of the arbor saw). The bottom and substantially non-load transferring surface of the recess 27 and the bearing projection 31 is inclined with respect to this axis. Thus, the inclined portion serves to provide a close fit of the frame piece and bearing bracket in all adjusted portions while the flat or parallel surface on the upper portion of the bearing projection 31 carries the actual load transmitted to the table from the frame piece 25. It is clear that considerable variation in length in the frame piece 25 can be tolerated in this construction without in any way interfering with the fine and sensitive operation of the unit in view of the fact that the brackets 33 can be moved axially to take up variations in the length of the frame piece.

Secured to the underside of the frame piece 25 is a housing 43 (Fig. 2) which may be regarded as the control center for the assembly. The housing 43 has a front face 45, sides 46, and a closed top 47, the rear side of the housing 43 being open. The top 47 of the housing 43 engages the bottom of the frame piece 25 and is secured against it by bolts 49 and 51 which pass through openings 53 and 55 in the frame piece 25 (Figs. 2 and 5). The openings 53 and 55 are spaced axially of each other with respect to the frame piece 25 and the rearmost opening 55 is arcuate about the axis of the opening 53 as a center. It will be seen that this arrangement permits the housing 43 to be adjusted about the axis of the bolt 49. It is held in adjusted positions about this axis by a pair of set screws 57 (Figs. 2 and 7) which thread through the end of the frame piece and bear against the front face 45 of the housing 43 on opposite sides of the bolt 49. When the housing 43 is tightly secured by the bolts 49 and 51 to the frame piece 25, it will tilt with the frame piece on the bearing surfaces 31 about the axis of the bearing surfaces.

This tilting of the frame piece 25 and the housing 43 is actuated by rotation of a tilt shaft or screw 59 (Fig. 3) which extends transversely of the axis of tilt and which threads into a swivel or pivot pin 61 that is mounted in a suitable aperture in the front face 45 of the housing 43 and in an upright ledge 63 formed on the housing 43, as best seen in Figs. 2 and 7. The shaft 59 is, of course, partially supported by the pin 61. Additional support is furnished by a swivel or pivot pin 65 (Figs. 1 and 3) which is pivotally mounted on a bifurcated portion 67 of a bracket 69. The bracket 69 is attached to the bottom of the table 1 by bolts 71 which extend through enlarged holes 72 so that adjustment of the bracket in assembly can be readily made. The portion of the shaft 59 within the pivot pin 65 has a retaining groove 73 (Fig. 12) formed therein to receive retaining set screw 75 which threads along the axis of the pin 65 into the groove 73 to bear on the side edges thereof and thereby hold the shaft 59 in a fixed axial position. The shaft 59 extends through a suitable opening in the side panel 7 of the box 3 and outside of the box has a suitable handle 77 mounted thereon. A spring 79 is confined under compression between the hub of handle 77 and the bifurcated portion of the bracket 69 and serves to remove end play by preloading the tilt screw so that the left-hand side of the groove 73 (Fig. 12) bears against the dog end of the screw 75. A snap-on ring 78 with projecting spring fingers and which acts as a one-way friction clutch is slipped over the end of the pin 61 and pressed against the bracket 69 (Figs. 12 and 12A) so that it holds the top surface of the bore in pin 65 against the top of the shaft 59 as viewed in Fig. 12.

It will be appreciated that upon turning of the handle 77 rotation of the screw 59 will enable the threads thereon, which extend through the pin 61, to cause the pin 61 to move along the axis of the screw carrying with it the housing 43 and the frame piece 25. Tilting about the axis of the bearing surfaces 31 thus takes place. Suitable bolts or stop nuts 81 (Fig. 1) may, of course, be threaded on the end of the shaft 59 to prevent disconnection in the event of excessive turning of the handle 77 and to act as a stop to insure that the saw blade is returned to its true initial position. It will be noted that this type of stop prevents an operator from "winding up" the mechanism in an attempt to move the blade too far. The nuts 81 shoulder on inclined surfaces 80 formed on the housing 43 as shown best in Fig. 7. A tilt stop bracket 82 (Figs. 1 and 3) may be bolted to the underside of the table and arranged to contact the saw blade or other tilting parts to control the extent of angular movement of the frame piece 25.

A bellcrank arm 83 extends through the opening at the rear of the housing 43 and is pivoted on taper pins 85 which thread into the sides 46 of the housing 43 (Fig. 10). Like parts 25 and 43, this part is preferably a die casting. It has an arbor supporting bore 87 (Fig. 9) formed therein and located rearwardly of pivot pins 85 which receives a double bearing construction 89 in which the saw arbor 91 is rotatably mounted. A set screw 93 (Fig. 2) extends through the wall of the bore 87 into a groove 95 in the bearing construction 89 to hold it in position in the bore 87. The arbor 91 extends out of opposite sides of arm 83 and on one side mounts a pulley sheave 97 which furnishes rotative power that it receives from the belt 99 to the shaft 91. The other end of the arbor shaft 91 carries an enlarged radial head 101 against which the saw blade 103 is pressed and clamped by means of a washer 105 and nut 107 which is threaded on the other end of the shaft 91. The frame piece 25 may be cut out, if necessary, to pass the head 101 as indicated at 108 (Fig. 2).

It will now be seen that the pivotal mounting of the arm 83 on the pointed pivot screws 85 permits the saw blade 103 to be raised and lowered in a vertical direction. This movement is controlled by an elevating screw shaft 109 that is threaded into a pivot pin 111 carried by a bifurcated portion 113 on the bottom of the arm 83 as seen in Figs. 2 and 8. The shaft 109 is journaled in and supported by a pivot pin 114 that is journaled in the sides 46 of the housing 45. The shaft has a circumferential groove 115 to receive a set screw 117 in the pin 114 which holds the shaft against axial movement though permitting it to be rotated upon turning of its handle 119. A coil spring 121 is mounted on the shaft 109 and confined between the housing and a washer 122 sliding on the shaft and pressed by the spring against a retainer 123 having an axially fixed position on the shaft and thus serves to preload the shaft axially and take up end play by causing the left-hand side of groove 115 (Fig. 11) to bear against the dog end of screw 117. A snap-on ring 124 (like ring 78) is mounted on pin 114 to hold one side thereof against one side of the shaft 109. A collar 125 is fixed in axial position on the shaft 109 by a set screw 127, accessible through the open bottom of cast housing 45 or alternatively the screw 127 could be disposed 90° from its present position and thus reached through the open bottom of the cast housing 45 and serves as a stop to engage portion 113 of the arm 83 and thereby limit lowering of the arbor saw blade 103. The shaft 109 extends through the opening 13 along with the pointer assembly 15 which is secured to the front face 45 of the housing 43 by a screw 129 (Fig. 7).

A splitter 131 and saw guard 133 may be attached to the frame piece 25 so that they tilt with the saw blade 103. The splitter 131 is a flat, vertical thin piece of metal and it and the saw blade are aligned to lie in the same plane. This could be done by shimming the saw blade 103 on shaft 91 so that it lines up with the splitter or by shimming the connection between the splitter and the vertical face of heavy splitter bracket 135 (Fig. 2) to which the splitter is firmly attached by screws 137. Preferably, however, the bracket 135 has oversize holes 136 in its horizontal flange which pass screws 139 that thread into a flange 140 at the bottom and the rear of the frame piece 25 and thus tilts with the frame piece 25 when the tilt screw 59 is turned. The holes 136 permit transverse adjustments sufficient to align the splitter and saw blades. The guard 133 is of a downwardly opening U-shaped cross section and at its rear is narrowed so that it slidably fits over the splitter 131. It is attached to the splitter by a nut and screw 141 which are free to move in an upwardly and rearwardly inclined slot 143. The slot 143 permits the guard to move to various positions spaced above the top of table 1 and thus accommodates different thicknesses of pieces being cut by the saw.

There is the usual large cutout 144 (Figs. 4 and 9) in the table top 1 for the saw blade 103 and to permit a wrench to pass for untightening nut 107. A removable insert 145 fits in the cutout, flush with the table surface, and has a longitudinal slot 147 for the saw blade. The insert 145 is removably held in place by clips 149 at each end which yieldably engage suitable shoulders on the table. As shown in Fig. 2, each clip 149 is shaped somewhat like a fishhook and is screwed to the underside of the insert. The free end of the clip is resilient and by engaging a corner shoulder of the table, as shown, it holds the insert in place but permits its ready removal upon application of a light upward force.

The motor 151 for driving the saw is mounted at the rear of the casing 3 on a base 303 (Fig. 3) that may be a part of the casing, but which is illustrated as a separate piece mounting for attachment to a bench top behind the saw. The base 303 may include a sheet metal stamping secured by screws 305 to the bench top and having a leg 307 at one side and a rib 309 at the other side. The top of the leg and the inside face 311 of the rib are inclined to the vertical so as to align with the angle-shaped rails 313. The bottom surfaces of the rails are on an angle to the horizontal which is one-half the total angle through which the saw blade 103 may be tilted from the vertical, i. e., on an angle of 22½ degrees in the present embodiment. The motor 151 is bolted to the rails 313 and therefore its shaft 163 extends at the same angle as the rails 313. The drive pulley 165 on shaft 163 thus makes an angle with the vertical and when driven pulley 97 is vertical the belt 99 is twisted through this angle. When the saw blade is tilted, this twist in the belt is lessened until it disappears at one half of the maximum tilt angle (22½ degrees) and then reversed as the blade is tilted beyond the half way point. This arrangement imposes a twist on the belt which is within permissible limits and eliminates the necessity for tilting the motor along with the blade. As will be seen from Figs. 3 and 3A, the rails have integral pins 315 extending transversely of one end of their upright legs. The pin on the upper rail fits in an oversize circular hole 317 in the leg 307 while the longer pin on the lower rail rests on the bottom of a slot 319 in face 311 of the rib 309 which opens out of the top of the rib. A line connecting the bottom of the slot and the bottom of the hole will be substantially 22½ degrees to the horizontal. The outer face 321 of the rib 309 is vertical to resist downward thrust from the pin on the lower rail. The top of the leg 307 and the face 311 of the rib are spaced apart by a distance which is a little greater than the overall width of the motor base with the rails 313 attached thereto. As a consequence, by shifting the motor and rails toward leg 307 and lifting the lower end of the motor, the lower pin 315 will come out of slot 311 and then by shifting the motor toward the rib 309 the other pin 315 can be withdrawn from hole 317. The motor and rails are therefore easily removed from the mount. It will be appreciated that the pulley belt 99 furnishes support for the motor inasmuch as its center of gravity is offset from the support furnished by pins 315 as will be seen from Fig. 3A. This offset is arranged so that to impose the proper preload on the pulley belt.

Figs. 13-19 illustrate a modified construction for attaching the frame piece 25' to the table 1. In this construction, identical sheet metal brackets 201 are used to support opposite ends of the frame piece. The brackets 201 have flanges 203 (Figs. 18 and 19) bent at right angles to the planes of the brackets which are provided with oversize holes 205 for the purposes already described that pass screws 207 by means of which the brackets are secured to the pads 41 which project downwardly from the undersurface of the table 1. The brackets 201 have slots 209 formed therein which are curved about a common axis (the axis of tilt) lying substantially on the surface of the table 1 when the brackets are mounted on the table.

Identical flat metal shoes 211 and 213 that ride in slots 209, are secured to the opposite end faces of the frame piece 25', the shoes also being arcuate about the axis of tilt. The shoes are oriented differently (Figs. 15 and 16) to accommodate the difference in orientation of slots 209 that results from the mounting of brackets 201 so that they face in opposite directions. The shoes 211 and 213 are pivoted on the rear and front faces, respectively, of the frame piece by groove pins 215 located at the centers of the shoes. On either sides of the pins 215, the shoes have oversize holes 217 that pass screws 219 that thread into holes 220 in the end faces of the frame piece 25' to clamp the shoes in place after they have been properly adjusted and aligned about the axis of pins 215. A right-angle bracket 221 (Figs. 13 and 14) is attached by screws 223 in holes 224 and by one screw 219 to the rear face of the frame piece 25', these screws extending through oversize holes in the bracket so as to permit transverse adjustments for the purpose of aligning the splitter and saw blade. It is also attached by nuts and screws 225 to the splitter 131 and thus connects the latter to the frame piece for tilting with the saw blade.

It is evident that in the modification shown in Figs.

13–19, the frame piece 25' may be adjusted at the assembly of the bench saw so that the saw blade, which is supported on the frame piece by means of the housing and arbor arm that have been already described, may be accurately aligned with the saw slot 147 in the insert 145. The brackets 201 may themselves each be adjusted lengthwise of the axis of tilt as well as transversely by virtue of the oversized holes 205 in their flanges 203. Though ordinarily not necessary, shims, washers, or the like can, of course, be used, if desired, to vary the elevation of the brackets. These may be placed, for example, between the bottom of a pad 41 in the top face of the flange 203. The shoes 211 and 213 on the end faces of the frame piece 25' can be adjusted angularly about the pins 215 so that they can be brought into proper arcuate alignment with the slots 209 in the brackets 201. The bottom edges of the shoes obviously rest on the bottom edges of the slots 209 to transfer the weight of the housing, arbor, and saw, as well as the tension of the belt 99 to the brackets 201 and thus to the table top 1.

The operation of the bench saw, as well as the various structural features which permit final adjustments when the various parts are assembled together, have already been described in connection with the detail parts which constitute preferred embodiments of the invention. By way of brief repetition, the form of the saw shown in Figs. 1–12 operates as follows:

The arbor 91 carries the saw blade 103 and is rotatably mounted on the bellcrank arm 83. The housing 43 constitutes the control center of the saw and is mounted on a frame piece 25 which is tiltably supported on trunnions 31 secured by bolts 35 to the bottom of the table 1. A tilt actuating screw 59 is journaled in a bracket 69 and threaded into a pin 61 carried by the housing 43 so that rotation of the screw 59 by means of the hand wheel 77 will cause the housing 43, frame piece 25, and bellcrank 83 along with the arbor 91 and saw blade 103 to tilt about the axis of the trunnions 31 which lies substantially in the surface of the table 1. The splitter and saw guard 131 and 133 are connected together and mounted by means of a bracket 135 on the bottom of the frame piece 125 so that they tilt along with the saw blade.

The oversized holes 37 in the brackets 31 permit them to be adjusted longitudinally of and transversely of the axis of tilt. This accommodates variations which may occur in the length of the frame pieces 25 and also permits a slight shifting of the frame piece so that the saw blade may be aligned parallel with the slot 47 in the insert 145. Considerable leeway is allowed in the spacing of the brackets 31 because of the semi-wedge construction of the grooves and trunnions 31. Very accurate alignment of the saw blade 103 with the slot 147 is permitted by means of the pivotal mounting of the housing 43 on the screw pin 49, the adjusted position being held by means of the set screws 57. Transverse adjustments of the saw blade 103 can also be achieved by means of the pointed bearing pivot screws 85 (Fig. 10). The location of the motor 151 on an incline which is substantially half of the angle through which the saw blade 103 is tilted avoids the necessity for tilting the motor along with the saw blade and does not subject the pulley belt 99 to excessive twisting.

Those in the art will realize that the saw construction shown herein is especially well adapted to low price, large-scale production. The various adjustments which are permitted at final assembly enlarge the dimensional tolerances which are permitted in the manufacture of the various individual parts and thus reduces their cost and greatly simplifies their assembly together. The three-piece support for the saw blade 103, consisting of the frame piece 25, the housing 43, and the bellcrank 83, all depending only from the table along with the operating screws 59 and 109 constitutes a lightweight yet strong and rigid mounting which can be more readily manufactured than the large castings heretofore used as supports for the saw blade. As evidence of the strength of this combination, it is possible to use dado blades on the arbor 91 instead of the saw blade 103 and still have perfectly satisfactory and continuous operation.

It is evident that various detail changes may be made in the construction illustrated herein without departing from the principles and scope of the invention.

What is claimed is:

1. In a tilting arbor saw, the combination of a frame having a table portion, a saw arbor, a frame piece carrying said arbor, trunnion means at opposite ends of the frame piece and mounting it on the frame for tilting about an axis lying substantially on the surface of the table portion, said trunnion means including a mating groove and projection on the frame and frame piece, said groove and projection being of substantially different lengths and said projection being engaged with and slidable relative to the wall of the groove to provide for said tilting, and mounting means for the projection including a threaded member and an oversize hole providing clearance all around the member to permit assembly adjustments of the projection, said projection being provided by a shoe pivoted on the end of the frame piece and having said oversize hole therein, said threaded member extending through said hole and into the end of the frame piece to prevent pivoting of the shoe.

2. The invention set forth in claim 2 wherein said groove is provided in a bracket, said bracket being attached by an oversize hole and threaded member to the frame, said hole providing clearance all around the member whereby the bracket may be adjusted in position at assembly.

3. The invention set forth in claim 2 wherein said shoe comprises a flat sheet metal stamping and said bracket also comprises a flat sheet metal stamping having a slot receiving said shoe and a pair of flanges bent at right angles to the plane of the slot and each containing an oversize hole to receive threaded members for attaching the bracket to the frame.

4. In a tilting arbor saw, the combination of a table top, a frame piece having bearing portions mounted on the table top for tilting of the frame piece about an axis lying substantially on the surface of the table, said frame piece including a relatively straight body substantially parallel to said table top connecting the bearing portions, a housing detachably carried by and beneath the frame piece body and rigidly connected thereto, a tilt actuating screw pivotally carried by said table top and operatively engaged with said housing, a bellcrank pivoted on said housing and having a first arm extending in the direction of said axis of tilt and a second arm extending transversely to said axis, means on said first arm for rotatably supporting an arbor, and an elevation actuating screw mounted on and carried by the housing and operatively engaging the second arm.

5. The invention set forth in claim 4 including mounting swivels for the tilt actuating and elevation actuating screws, one way clutch type snap rings operatively connected to the swivels to hold them in firm bearing engagement with one side of their respective screws, said screws having circumferential grooves therein, dog point pins in said swivels fitting in said grooves to prevent axial movement of the screws, said pins extending axially of the swivels and located diametrically opposite to said one side, and springs confined between the respective mounting swivels for the tilt and elevation actuating screws and shoulders on said screws for preloading the screws to press the dog pins against one side of their respective grooves and remove end play thereof.

6. In a tilting arbor saw, the combination of a frame having a table portion on top, a frame piece mounted on the frame for tilting about an axis lying substantially on the surface of the table, said frame piece having substantially the shape of a flat bar with the width thereof beneath and parallel to said table portion when said frame piece is in untilted position, said frame piece having a substantially flat face on the bottom thereof, means for adjusting the frame piece longitudinally and transversely of said axis to properly orient it with respect to said axis at assembly of the saw, a downwardly extending housing carried by the frame piece and tiltable therewith, said housing having a substantially flat top surface engaging said flat face, substantially all of said housing being located below said frame piece, means securing the housing to the frame piece so that said surface is fixed to said face and providing for selectively shifting the position of the surface on said face and thereby aligning the housing with said axis, said housing being suspended from the frame piece and made rigid therewith after said aligning by said means, and means on the housing for carrying a saw arbor.

7. The invention set forth in claim 6 wherein said last-mentioned means includes a bellcrank pivoted on the housing beneath the frame piece and having an arm with an arbor receiving portion movable toward and away from said axis to selectively elevate and lower the arbor, and means for pivoting the bellcrank.

8. The invention set forth in claim 6 wherein the housing is secured to the frame piece for pivoting about a vertical axis to provide said selective shifting, and including a member that rides in a slot in the frame piece during such pivoting and is operative to clamp the housing to the frame piece, and screw means threaded respectively into the frame piece on opposite sides of the axis of pivot and engageable with the housing to hold it in a desired pivotal position.

9. In a tilting arbor saw having a casing, a table removably secured to the top of said casing, a frame tiltably supported by said table for angular movement about an axis substantially in the surface of the table, a saw arbor support member adjustably supported on the frame and having an arbor supporting portion movable toward and away from the table, an elevating shaft supported on the frame and operatively connected to the member so that rotation of the shaft moves the portion toward and away from the table, a tilt shaft, bracket means depending from the table and supporting one portion of the tilt shaft, said tilt shaft being operatively connected to the frame so that rotation of the shaft tilts the frame about said axis, said shafts, frame, and member being supported solely by and removable from the casing with said table and being independent of said casing.

References Cited in the file of this patent

UNITED STATES PATENTS

| | | |
|---|---|---|
| 189,498 | Rose | Apr. 10, 1877 |
| 229,841 | Rinehart et al. | July 13, 1880 |
| 473,429 | Phillips | Apr. 19, 1892 |
| 844,590 | Haldeman | Feb. 19, 1907 |
| 1,381,986 | Gilbert | June 21, 1921 |
| 1,463,406 | Serrell et al. | July 31, 1923 |
| 1,720,484 | Lantz | July 9, 1929 |
| 1,922,151 | Boice et al. | Aug. 15, 1933 |
| 1,942,834 | Railley | Jan. 9, 1934 |
| 2,005,100 | Merrigan | June 18, 1935 |
| 2,121,069 | Collins | June 21, 1938 |
| 2,131,492 | Ocenasek | Sept. 27, 1938 |
| 2,168,282 | Tautz | Aug. 1, 1939 |
| 2,265,406 | Tautz | Dec. 9, 1941 |
| 2,265,407 | Tautz | Dec. 9, 1941 |
| 2,407,341 | Meyer | Sept. 10, 1946 |
| 2,445,182 | Odey | July 13, 1948 |
| 2,530,290 | Collins | Nov. 14, 1950 |